United States Patent
Kustosch et al.

(10) Patent No.: US 6,901,325 B2
(45) Date of Patent: May 31, 2005

(54) METHOD AND ARRANGEMENT FOR LIMITING THE SPEED OF A VEHICLE

(75) Inventors: Mario Kustosch, Markgroeningen (DE); Christian Muehlbauer, Echterdingen (DE); Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/655,297

(22) Filed: Sep. 5, 2003

(65) Prior Publication Data

US 2004/0049333 A1 Mar. 11, 2004

(30) Foreign Application Priority Data

Sep. 5, 2002 (DE) ......................................... 102 41 059

(51) Int. Cl.$^7$ ............................................. G06F 17/00
(52) U.S. Cl. ....................................................... 701/93
(58) Field of Search ...................... 701/70–71, 74–75, 701/78, 82–87, 90–91, 93–96, 103–104, 110–112; 123/325, 322, 335–336, 339.13, 399

(56) References Cited

U.S. PATENT DOCUMENTS 6,526,347 B2 * 2/2003 Kim ............................ 701/104
6,546,329 B2 * 4/2003 Bellinger .................... 701/115

* cited by examiner

*Primary Examiner*—Thu V. Nguyen
(74) *Attorney, Agent, or Firm*—Walter Ottesen

(57) ABSTRACT

A method and an arrangement are suggested for limiting the speed of a vehicle to a limit speed with the arrangement not needing an integral component and nonetheless being precise at steady state. A maximum permissible acceleration proportional to the difference between an actual speed and the limit speed is determined. From the maximum permissible acceleration, a limit value for an output quantity of a drive unit of the vehicle is determined by means of a vehicular dynamic operation equation in dependence upon the running resistance. The magnitude of the limit value for limiting the speed of the vehicle to the limit speed may not be exceeded.

7 Claims, 3 Drawing Sheets

METHOD AND ARRANGEMENT FOR LIMITING THE SPEED OF A VEHICLE

BACKGROUND OF THE INVENTION

In addition to the functions for controlling a pregiven speed, also functions for limiting to a pregiven upper speed threshold or limit speed via a speed limiting function are known for gasoline-control apparatus and diesel-control apparatus. The functions for controlling speed are, for example, done by means of a road speed controller or a pregiven distance controlled, for example, by means of a vehicle dynamics control. Such applications include all limitations on the upper limit speed such as maximum speeds, which are inputted by the driver via an operator-controlled apparatus, or automatically pregiven limit speeds based on monitoring functions and comfort functions such as traffic sign recognition, exceeding maximum weight, pressure loss in the tires, detection of travel in a curve.

A limiting of the driver command is easily carried out in vehicles having an electronic accelerator pedal. If, however, a road speed control and a speed limiting function are simultaneously active, then this can lead to conflicts, for example, when, on the one hand, the road speed control is controlled to 80 km/h but, on the other hand, the upper limit speed is at 50 km/h. The controller of the road speed control and the controller of the speed limiting function could then run counter to each other and possibly available integrators of the controller would assume large values which could lead to unwanted overshoots when switching off one of the two controllers. In this way, the driving comfort could be severely affected.

SUMMARY OF THE INVENTION

With respect to the above, the method and arrangement of the invention afford the advantage that a maximum permissible acceleration is determined which is proportional to the difference between an actual speed and the limit speed and that a limit value for an output quantity of a drive unit of the vehicle is determined from the maximum permissible acceleration via a vehicle dynamics equation in dependence upon a running resistance. The magnitude of this limit value for limiting the speed of the vehicle to the limit speed may not be exceeded. In this way, a speed limiting function without an integral component may nonetheless be precisely realized in steady state. With the described control algorithm, the limit speed can be approached very comfortably via an exponential function whose time constant is applicable via the proportional amplification factor of the speed deviation. With the aid of the vehicle dynamics equation, a conversion between the maximum permissible acceleration and the limit value for the output quantity of the drive unit of the vehicle is possible.

It is especially advantageous when the output quantity is pregiven via a minimal selection between a value derived from a driver command or derived from a road speed control of the limit value. In this way, it is ensured that the output quantity of the drive unit for maintaining the maximum permissible acceleration is limited.

A further advantage is that a desired speed, which is pregiven by the road speed control, is limited to the limit speed. In this way, a conflict between the road speed control and the speed limit function is avoided and a run-up of an integral component, which is possibly present in the road speed controller, is avoided. In this way, it is prevented that, when switching off the speed limiting function, unwanted overshoots in the road speed control occur. In this way, the driving comfort is not affected.

It is especially advantageous when the limiting of the speed is lifted in dependence upon the driver command especially by means of a kick down. In this way, the speed limiting function can be switched off or deactivated when this is wanted for reasons of safety, for example, for a passing operation by the driver.

A further advantage is that the limit value for the output quantity of the drive unit becomes effective only within a pregiven range about the limit speed. In this way, it is ensured that the approach of the actual speed to the limit speed does not take place abruptly so that the driving comfort is increased. In contrast, outside of the pregiven range, any desired speed course, which is wanted by the driver, is possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
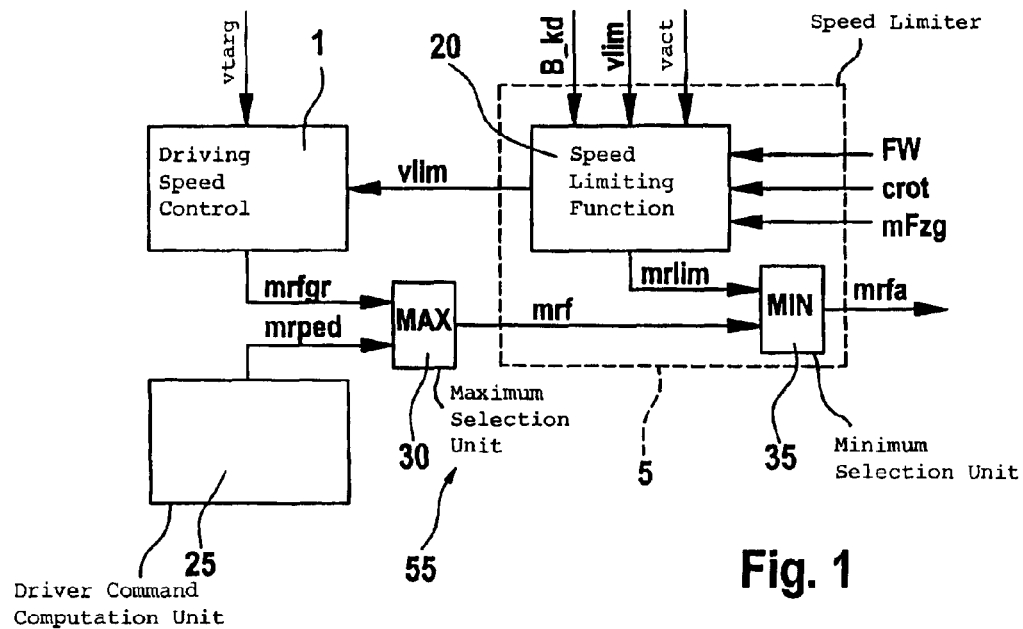
FIG. 1 is a block circuit diagram showing the arrangement according to the invention.

In FIG. 1, reference numeral 55 identifies a control for adjusting a speed of the motor vehicle having a drive unit. The drive unit includes, for example, an internal combustion engine or an electric motor or is based on any other desired alternative drive concept. When using an internal combustion engine, the engine can, for example, be a spark-ignition engine or a diesel engine. In the following, it is assumed by way of example, that the drive unit includes an internal combustion engine.

The control 55 can, for example, be integrated in an engine control of the vehicle and can be realized as hardware and/or as software. The control 55 includes an arrangement 5 for limiting the speed of the vehicle. The arrangement 5 therefore defines a speed limiter. The speed limiter 5 includes a speed limiting function 20 to which a limit speed vlim is supplied and this speed limiting function determines a limit value for an output quantity of the drive unit in dependence upon the limit speed vlim. The output quantity of the drive unit can, for example, be a wheel output torque, a transmission output torque or an engine output torque. The output quantity can also be an engine output power or otherwise any desired quantity derived, for example, from the engine output torque.

In the following, it is assumed by way of example, that the output quantity is the engine output torque. The limit value for the engine output torque is shown in FIG. 1 by the designation "mrlim". The limit speed vlim can be supplied to the speed limiting function 20, for example, by the driver via an operator-controlled element (not shown) or automatically based on monitoring and comfort functions. Such monitoring and comfort functions can pregive the limit speed vlim, for example, on the basis of a traffic sign recognition, exceeding of the maximum permissible weight of the vehicle, a pressure loss in the tires of the vehicle, a detection of travel in a curve, known per se.

Figure 2:
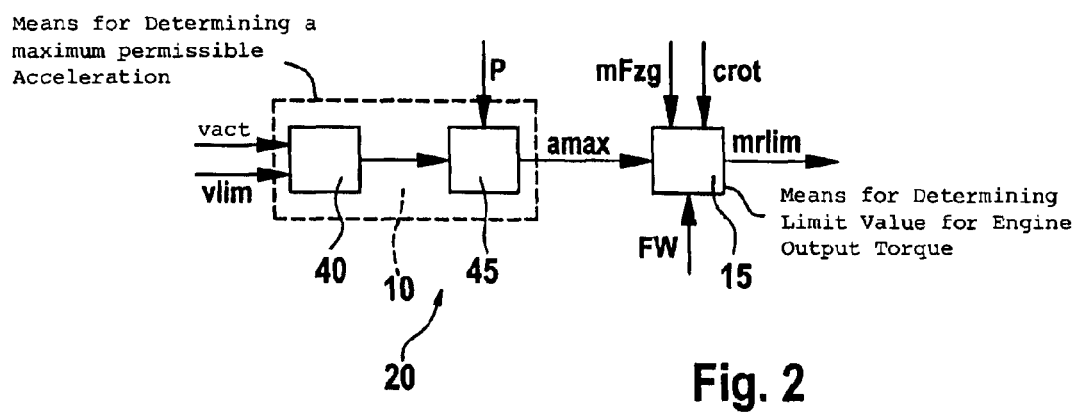
FIG. 2 is a function diagram for explaining a speed limiting function in accordance with the invention.
Figure 3:
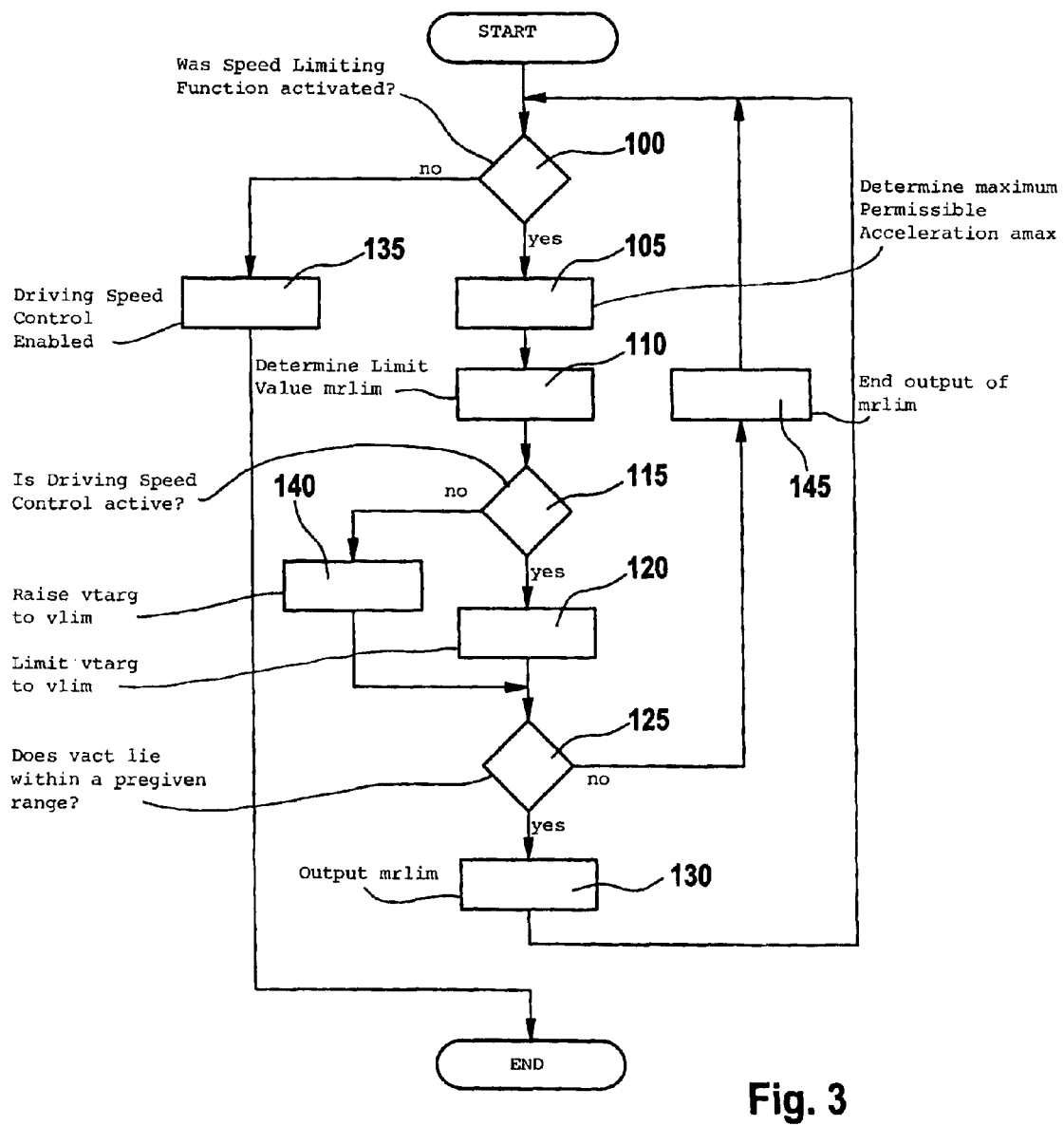
FIG. 3 is a flowchart for explaining the method of the invention.

In FIG. 2, the speed limiting function 20 is shown in greater detail in the form of a function diagram. Here, the speed limiting function 20 according to the function diagram of FIG. 2 can be realized by hardware and/or software. The speed limiting function 20 includes means 10 for determining a maximum permissible acceleration of the vehicle as well as means 15 which determine the limit value mrlim for the engine output torque from the maximum permissible acceleration utilizing a vehicle dynamics equation in dependence upon a running resistance. The magnitude of the limit value mrlim may not be exceeded for limiting the speed of the vehicle to the limit speed vlim.

The means 10 can also be characterized as an acceleration determining unit and the means 15 as a limit value determination unit.

An actual speed vact of the vehicle is supplied to the speed limiting function 20 of FIG. 1 from a speed measuring unit. The speed measuring unit determines the actual speed vact in a manner known per se.

The acceleration determination unit 10 includes a difference member 40 to which the actual speed vact and the limit speed vlim are supplied. The difference member 40 forms the difference a Δ=vlim-vact and transmits this difference to a multiplication member 45. There, the difference Δ is multiplied by a first proportionality factor P in the unit 1/s. In this way, the maximum permissible acceleration amax of the vehicle results at the output of the multiplication member 45. The maximum permissible acceleration amax is supplied to the limit value determination unit 15 as well as is a vehicle mass mFzg, a corrective factor crot and a running resistance FW. The limit value determination unit 15 determines a drive force FA from the above-mentioned input quantities by means of a vehicular dynamic operation equation as follows:

$$mFzg*a*(1+crot)=FA-FW \quad (1)$$

The running resistance, that is, the running resistance force FW, the corrective factor crot and the vehicle mass mFzg are likewise supplied to the speed limiting function 20 as shown in FIG. 1. The running resistance force FW can be estimated in a manner known per se with the aid of a characteristic field, which is adapted under test conditions, in dependence upon the instantaneous driving situation. The influences on the running resistance force FW include especially the rolling friction of the vehicle and an ascent of the roadway which is possibly present and must be overcome. The corrective factor crot considers the inertia of the rotating masses and is dependent upon the instantaneous transmission ratio. The corrective factor crot can be stored in dependence upon the instantaneous transmission ratio likewise in a characteristic line as known per se. Vehicle mass mFzg is known and is fixedly pregiven or can be adapted with the aid of the vehicular dynamic operation equation as known per se.

From the determined drive force FA, the limit value determination unit 15 determines the limit value mrlim, which is proportional thereto, of the engine output torque via multiplication by a second proportionality factor adapted, if required, likewise in a test operation. This second proportionality factor is used generally for converting each desired drive force FA into the corresponding engine output torque.

The computation of the maximum permissible acceleration amax by the acceleration determination unit 10 takes place, as described, in accordance with the following formula:

$$amax=P*(vlim-vact) \quad (2)$$

If, in equation (2), the maximum permissible acceleration amax is expressed as a differentiation of the speed, then a differential equation results. The solution of the differential equation is an exponential function whose time constant is the inverse of the first proportionality factor, that is, 1/P. In the ideal case of an exact running resistance adaptation, an exponential transient of the actual speed vact to the limit speed vlim results therewith when accelerating at the maximum acceleration and therefore when realizing the limit value mrlim of the engine output torque. In this way, the speed limiting function 20 can be realized without an integral component and nonetheless precisely at steady state on the basis of the use of the equations (1) and (2). The first proportionality factor P can be suitably applied as a time constant of the transient operation by means of the exponential function. For a sporty driver, the first proportionality factor P can be selected greater in order to realize a smaller time constant of the transient operation and therefore allow a greater maximum permissible acceleration. For the case of a wanted economic driving, the first proportionality factor P can be selected smaller in order to realize a greater time constant of the transient operation and therefore obtain a smaller maximum permissible acceleration whose realization requires less fuel.

The limiting of the actual speed vact to the limit speed vlim can be used for actual speeds which are less than the limit speed vlim as well as for actual speeds vact which are greater than the limit speed vlim. On the basis of equation (2), and in the case of actual speeds vact less than the limit speed vlim, the actual acceleration aact of the vehicle is limited at the upper end by the maximum permissible acceleration amax in order to prevent accelerations, which are too great when the actual speed vact approaches the limit speed vlim from below, and therefore prevent an abrupt end of the acceleration when reaching the limit speed vlim and prevent the driving comfort from being affected. If actual speeds vact greater than the limit speed vlim are to be limited to the limit speed vlim, then the actual acceleration aact of the vehicle is limited at the upper end by the maximum permissible acceleration amax, which in this case is negative, so that decelerations, which are too great, are avoided when the actual speed vact approaches the limit speed vlim, and to therewith likewise avoid an abrupt removal of the deceleration when reaching the limit speed vlim and the unwanted effect on the driving comfort associated therewith.

It can be optionally provided that also a driver command torque mrf is supplied to the speed limiter 5 which defines a desired value for the engine output torque with the objective of realizing a speed or acceleration wanted by the driver. In order to ensure the limitation to the maximum permissible acceleration amax, the limit value mrlim for the engine output torque and the driver command torque mrf are therefore supplied to a minimum selection member 35 of the speed limiter 5 which selects the minimum from the limit value mrlim and the driver command torque mrf and transmits the same to a corresponding unit of the engine control as desired value mrfa for realization. This desired value mrfa is the desired value to be finally realized. The realization can take place via a suitable adjustment of the fuel path in a diesel engine or the air path and/or the ignition angle path in a spark-injection engine in a manner known per se.

The driver command torque mrf can, for example, be based on a driver command derived from a driving speed control 1 or an accelerator pedal position of the vehicle. In the case of the vehicle speed control 1, the driver sets a target speed vtarg, for example, via a vehicle speed control (tempomat) lever. The driving speed control 1 then determines a desired torque mrfgr in a manner known per se for realizing the target speed vtarg. In FIG. 1, reference numeral 25 identifies a driver command computation unit which, in a manner known per se, makes possible a desired torque mrped for adjusting a vehicle speed or vehicle acceleration assigned to the accelerator pedal position. The desired torques mrfgr and mrped are supplied to a maximum selection unit 30. The maximum selection unit 30 selects the maximum from the two desired torques mrfgr and mrped and transmits the same as the driver command torque mrf to the speed limiter 5.

Because of the steady state control deviation of proportional controllers, many driving speed controllers include an integral component. This must be considered in the combination with the speed limiting function 20. No problems result as long as the target speed vtarg, which is to be realized by the drive speed control 1, remains less than the limit speed vlim. However, if the drive speed control 1 is activated with an active speed limiting function 20 or the speed limiting function 20 is activated with an active driving speed control 1, then the target speed vtarg is limited to the limit speed vlim. For this purpose, the limit speed vlim is supplied by the speed limiting function 20 to the driving speed control 1. The target speed vtarg, which is to be realized by the driving speed control 1, is therefore not greater than the limit speed vlim and is limited to the limit speed vlim. In this way, the driving speed control 1 can control the target speed vtarg by means of the desired torque mrfgr and a run-up or pull-up of the integral component in the driving speed control 1 is avoided. Here, the limiting of the target speed vtarg of the driving speed control 1 must be carried out with each increase of the target speed vtarg via an actuation of the tempomat lever or with each reduction of the limit speed vlim. After the deactivation of the speed limiting function 20, the originally selected target speed vtarg can be resumed without a limit speed having to be considered by the speed limiting function 20.

A run-up of the integral component of the driving speed control 1 with a simultaneously active speed limiting function 20 and a non-limited target speed vtarg results when the target speed vtarg is greater than the limit speed vlim. Because of the active speed limiting function 20, the target speed vtarg is not reached so that the integral component of the driving speed control 1 must run up. If the speed limiting function 20 is deactivated, no limit value mrlim is outputted any more by the speed limiting function 20 and the driver command torque mrf as desired torque mrfa to be realized is outputted at the output of the minimum selection member 35. In this way, a torque jump of the desired torque mrfa, which is to be realized, to the desired torque mrfgr, which is outputted by the driving speed control 1, results at the output of the minimum selection member 35 in the event that the desired torque mrfgr is greater than the desired torque mrped of the driver command computation unit 25. This leads to a sudden increase of the vehicle acceleration and therefore to an uncomfortable driving performance. Such an unwanted run-up of the integral component of the driving speed control 1 is avoided, as described, by limiting the target speed vtarg to the limit speed vlim with an active speed limiting function 20, so that, for a deactivation of the speed limiting function 20, the torque jump at the output of the minimum selection member 35 does not occur. An enablement of the target speed vtarg with a deactivation of the speed limiting function 20 leads, at most, to a continuous increase of the desired torque mrfgr at the output of the driving speed control 1 so that a jump of the desired torque mrfa, which is to be realized, can be avoided at the output of the minimum selection member 35. In this way, the advantage is achieved that a simultaneous activation of the driving speed control 1 and the speed limiting function 20 is possible without conflict, that is, the simultaneous activation is possible without a run-up of the integral component of the controller.

In the following, the operation of the driving speed control 1 and the speed limiting function 20 is again explained by way of example. For a switched off or deactivated speed limiting function 20, the function of the driving speed control 1 is independent of the speed limiting function, that is, the target speed vtarg is not limited.

For a switched on or activated speed limiting function 20, the limiting of the target speed vtarg takes place in dependence upon the various operating modes of the driving speed control 1 as explained hereinafter.

When setting the driving speed control 1 to the target speed vtarg, for example, by means of the driving speed control (tempomat) lever, a check is made in the driving speed control 1 as to whether the pregiven target speed vtarg is greater than the limit speed vlim. If this is the case, then the target speed vtarg is set to the limit speed vlim. Otherwise, the target speed vtarg is retained unchanged. If the tempomat lever is tapped by the driver for increasing the target speed, then the target speed vtarg is increased by a speed increment if, in this way, the limit speed vlim is not exceeded. Otherwise, the target speed vtarg is not increased. If the tempomat lever for accelerating is tapped for a longer time span, then this leads to an increase of the target speed vtarg as long as the limit speed vlim is not exceeded. When reaching the limit speed vlim, the target speed vtarg is not further increased.

If the tempomat lever is tapped in order to reduce the target speed vtarg or the tempomat lever is tapped over a longer time for deceleration, then a corresponding reduction of the target speed vtarg takes place independently of the limit speed vlim. With a resumption of the driving speed control, a limiting of the target speed vtarg takes place as described for setting.

For the case that the speed limiting function 20 is switched in when the driving speed control 1 is active, no special action takes place when the target speed vtarg does not exceed the limit speed vlim. Otherwise, the driving speed control 1 resumes at a target speed vtarg which corresponds to the limit speed vlim. The reduction of the target speed vtarg to the limit speed vlim can be realized by means of a continuous ramp function for the corresponding reduction of the desired torque mrfgr which is outputted by the driving speed control 1 in order to avoid a jolt-like deceleration of the vehicle and to not affect the driving comfort.

When the speed limiting function 20 is switched off while the driving speed control 1 is active, then the driving speed control 1 resumes at the original target speed vtarg if this speed was greater than the limit speed vlim which is valid for an activated road speed limiting function 20. In this case, the resumption of the driving speed control 1 likewise takes place, for example, by means of a resumption characteristic line which raises the desired torque mrfgr, for example, by means of a continuous ramp function in order to raise the target speed vtarg from the limit speed vlim, which was previously applicable, comfortably to the greater target speed originally applicable.

In FIG. 2, the method of the invention is presented by way of example based on a flowchart. After the start of the program, a check is made by the engine control at program point 100, for example, whether the speed limiting function 20 for limiting the speed of the vehicle to the limit speed vlim was activated. Such an activation can, as described, take place by the action of the driver via an operator-controlled element or based on monitoring functions and comfort functions such as traffic sign recognition, exceeding the maximum weight, pressure loss in the tires, recognition of travel in a curve, et cetera. Such monitoring and comfort functions can be realized as known per se. The activation of the speed limiting function 20 can take place via an activation signal (not shown in FIG. 1) by the operator-controlled element actuated by the driver or by the monitoring and comfort functions and this activation signal is also supplied to the engine control. If, at program point 100, an active speed limiting function 20 is detected in the engine control, then the program branches to program point 105, otherwise, the program branches to program point 135.

At program point 135, the engine control enables the driving speed control 1 for adjusting and realizing a desired target speed vtarg. The engine control is likewise not shown in FIG. 1 for reasons of clarity. Thereafter, there is a movement out of the program. The program can then be run through as often as desired, for example, at regular time intervals. The time interval between two program runthroughs is advantageously selected as short as possible in order to detect as early as possible changes in the activation of the driving speed control 1 and the speed limiting function 20 as well as in the input of the target speed vtarg and the limit speed vlim and to initiate the corresponding consequences.

At program point 105, the acceleration determination unit 10, for example, is likewise caused by the engine control to determine the maximum permissible acceleration amax in the manner described. Thereafter, there is a branching to program point 110.

At program point 110, the engine control, for example, causes the limit value determination unit 15 to determine the limit value mrlim for the engine output torque in the manner described. Thereafter, the program branches to program point 115.

At program point 115, the engine control checks whether the driving speed control 1 is active. This can take place, for example, by comparing the desired torque mrfgr at the output of the driving speed control 1 to the driver command torque mrf at the output of the maximum selection member 30. If the two torques are the same, then it can be assumed that the driving speed control 1 is active. Otherwise, it can be assumed that the driving speed control 1 is just then not active. For this purpose, the output of the driving speed control 1 and the output of the maximum selection member 30 can be supplied to the engine control. If it is determined at program point 115 that the vehicle speed control 1 is active, then the program branches to program point 120; otherwise, the program branches to program point 140.

At program point 140, a possibly present limiting of the target speed vtarg to the limit speed vlim is disabled. Thereafter, the program branches to program point 125.

At program point 120, a target speed vtarg, which exceeds the limit speed vlim, is limited to the limit speed vlim in the manner described. Thereafter, the program branches to program point 125.

The disablement of the limiting at program point 140 or the introduction of a limiting at program point 120 can likewise be caused by the engine control.

At program point 125, the engine control checks whether the actual speed vact lies in a pregiven range about the limit speed vlim. For this purpose, the actual speed vact as well as the limit speed vlim can be supplied to the engine control. If the actual speed vact lies in the pregiven range about the limit speed vlim, then the program branches to program point 130; otherwise, the program branches to program point 145.

At program point 130, the engine control causes the output of the limit value mrlim for the engine output torque to the minimum selection unit 35. Thereafter, the program branches back to program point 100 and the program is run through anew.

At program point 145, the engine control causes an end of the output of the limit value mrlim to the minimum selection unit 35 so that the speed limiting function 20 is switched to be ineffective and therefore is deactivated. Thereafter, the program branches to program point 100 and the program is run through anew.

Figure 4:
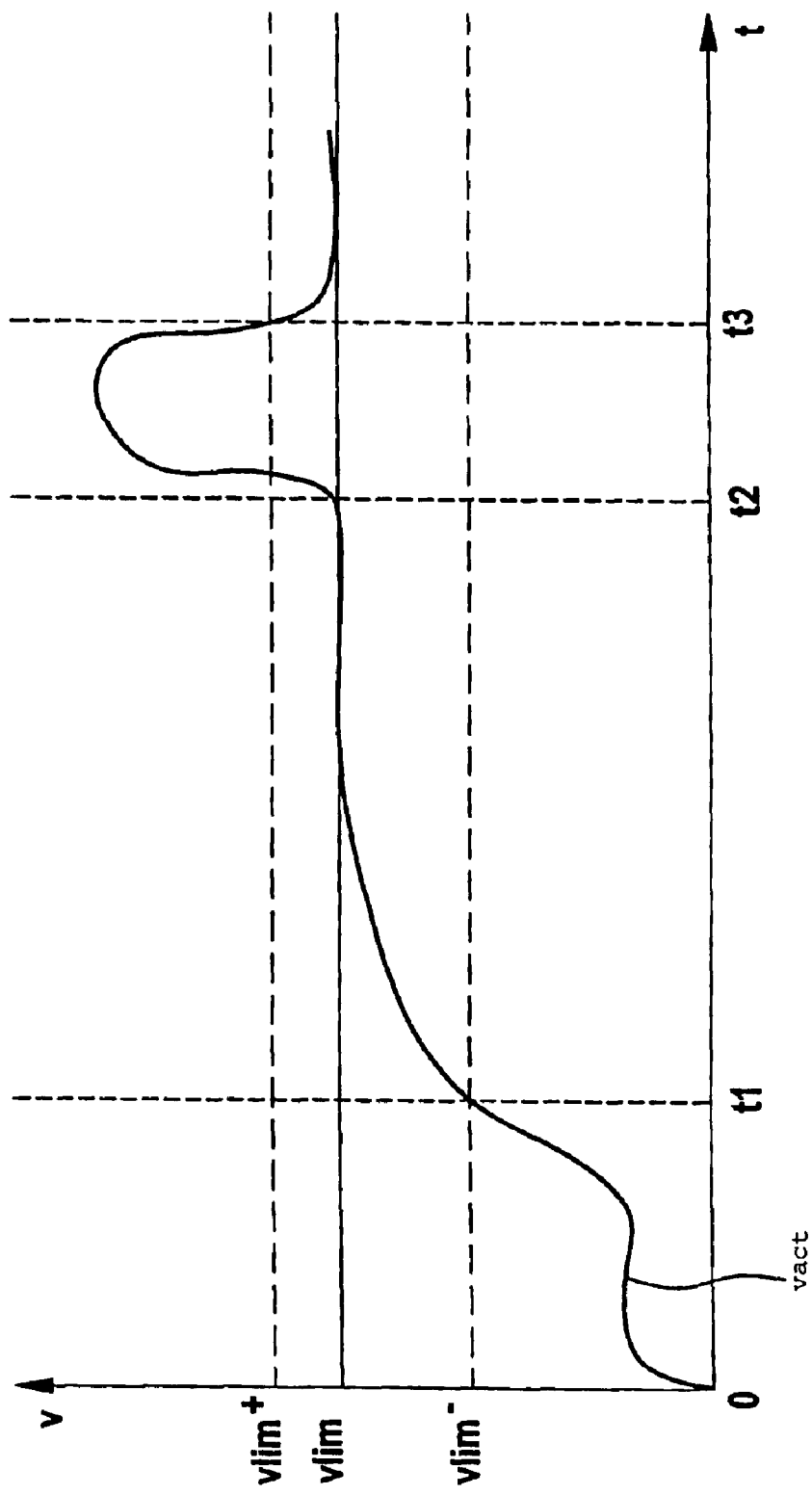
FIG. 4 is an exemplary course of an actual speed of the vehicle as a function of time.

In FIG. 4, a speed-time diagram is shown which shows the speed v of the vehicle as a function of time t. Here, and by way of example, a course of the actual speed vact as a function of time t is shown. Up to a first time point $t_1$, the actual speed vact is less than a lower speed threshold value $vlim^-$. Accordingly, up to the first time point $t_1$, the speed limiting function 20 is not active because the actual speed vact is not in the pregiven range about the limit speed vlim which is limited downwardly by the lower speed threshold value $vlim^-$. From the first time point $t_1$, the actual speed vact exceeds the lower speed threshold value $vlim^-$ so that the speed limiting function 20 is activated and a further increase of the actual speed vact is limited via the maximum permissible acceleration amax. According to the example of FIG. 4, it should be assumed that the actual speed vact is increased starting from the first time point $t_1$ at the maximum permissible acceleration so that the actual speed exponentially approaches the limit speed vlim with the time constant 1/P which is greater than the lower speed threshold value $vlim^-$. Approximately at a second time point $t_2$, which follows the first time point $t_1$, the actual speed vact reaches the limit speed vlim. Here, it should be assumed that, at the second time point $t_2$, the driver inputs an acceleration command, for example, by means of a kick-down function which is supplied to the speed limiting function 20 and disables this function. Generally, it can be provided to disable the speed limiting function 20 when an acceleration command of the driver is pregiven at the accelerator pedal of the vehicle in such a manner that this command exceeds a pregiven acceleration threshold value. As long as this is the case, a signal B_kd is set which is supplied to the speed limiting function 20 according to FIG. 1 and disables the speed limiting function 20. At a third time point $t_3$, which follows the second time point $t_2$, the actual speed vact drops below an upper speed threshold value $vlim^+$, which is greater than the limit speed vlim and limits upwardly the pregiven range about the limit speed vlim. In this way, the bit B_kd is again reset and the speed limiting function 20 is again activated. The speed limiting function 20 is also again activated when there is again a drop below the pregiven acceleration threshold by the acceleration command of the driver. In this case too, the bit B_kd is again reset. From the third time point $t_3$ on, it should be assumed by way of example, that the actual speed vact approaches the limit speed vlim with the maximum permissible acceleration (which, in this case, is the minimum permissible deceleration) exponentially with the time constant 1/P.

The pregiven range about the limit speed vlim is limited upwardly by the upper speed threshold $vlim^+$ and downwardly by the lower speed threshold $vlim^-$. The speed limiting function 20 is only active when the actual speed vact is within the pregiven range. In this way, any acceleration, which is wanted by the driver, is permitted outside of the pregiven range. The limiting of the acceleration or deceleration in the pregiven range to the maximum permissible acceleration has the consequence that an abrupt ending of the acceleration or the deceleration is avoided when the actual speed vact reaches the limit speed vlim and thereby a comfortable transition is provided. Depending upon the selection of the first proportionality factor P, the time constant for reaching the limit speed vlim can be varied by the actual speed so that for sporty drivers, a more intense speed change up to reaching the limit speed vlim can be made possible than for economic drivers who prefer comfort and fuel efficiency.

It is understood that the foregoing description is that of the preferred embodiments of the invention and that various changes and modifications may be made thereto without departing from the spirit and scope of the invention as defined in the appended claims.

What is claimed is:

1. A method for limiting the speed of a vehicle to a limit speed, the method comprising the steps of:

determining a maximum permissible acceleration proportional to the difference between an actual speed and the limit speed;

determining a limit value for an output quantity of a drive unit of the vehicle from the maximum permissible acceleration utilizing a vehicle dynamics equation in dependence upon a running resistance; and, not allowing the magnitude of said limit value for limiting the speed of the vehicle to the limit speed to be exceeded.

2. The method of claim 1, wherein a torque is selected as said output quantity of said drive unit.

3. The method of claim 1, wherein said output quantity is pregiven by a minimum selection between a value derived from a driver command or a drive speed control and said limit value.

4. The method of claim 3, wherein a desired speed pregiven by said drive speed control is limited to the limit speed.

5. The method of claim 1, wherein the limiting of the speed is disabled in dependence upon the driver command including a kick-down.

6. The method of claim 1, wherein said limit value for said output quantity of said drive unit is effective only within a pregiven range about said limit speed.

7. An arrangement for limiting the speed of a vehicle to a limit speed, the arrangement comprising:

means for determining a maximum permissible acceleration proportional to the difference between an actual speed and the limit speed;

means for determining a limit value for an output quantity of a drive unit of a vehicle from the maximum permissible acceleration utilizing a vehicle dynamics equation in dependence upon a running resistance; and, means for not allowing the magnitude of said limit value for limiting the speed of the vehicle to the limit speed to be exceeded.

* * * * *